(12) United States Patent
Miller et al.

(10) Patent No.: US 7,433,086 B2
(45) Date of Patent: Oct. 7, 2008

(54) EDGE DETECTION AND CORRECTING SYSTEM AND METHOD

(75) Inventors: James Vradenburg Miller, Clifton Park, NY (US); Paulo Ricardo Dos Santos Mendonca, Clifton Park, NY (US); Matthew William Turek, Ballston Lake, NY (US); Dirk Ryan Padfield, Albany, NY (US)

(73) Assignee: General Electric Company, Niskayuna, NY (US)

(*) Notice: Subject to any disclaimer, the term of this patent is extended or adjusted under 35 U.S.C. 154(b) by 717 days.

(21) Appl. No.: 10/951,301

(22) Filed: Sep. 27, 2004

(65) Prior Publication Data

US 2006/0066911 A1   Mar. 30, 2006

(51) Int. Cl.
*H04N 1/40* (2006.01)
(52) U.S. Cl. ...................... 358/3.27; 382/266

(58) Field of Classification Search .............. 358/2.1, 358/3.15, 3.27; 382/199–200, 260–261, 382/265–269, 128, 131–132
See application file for complete search history.

(56) References Cited

U.S. PATENT DOCUMENTS

| 6,055,340 | A  | * | 4/2000 | Nagao ................ 382/261 |
| 6,574,304 | B1 |   | 6/2003 | Hseih et al. |
| 6,628,842 | B1 | * | 9/2003 | Nagao ................ 382/266 |
| 6,748,044 | B2 |   | 6/2004 | Sabol et al. |

* cited by examiner

*Primary Examiner*—Thomas D Lee
*Assistant Examiner*—Stephen M Brinich
(74) *Attorney, Agent, or Firm*—Jason K. Klindtworth

(57) ABSTRACT

An imaging system for correcting a bias in the location edges in an image is provided. The imaging system comprises an image processor configured to detect edges in an image of a given substructure, characterize a blurring factor in the image and correct a bias in the detected edges in the of a given substructure using the blurring factor.

19 Claims, 5 Drawing Sheets

EDGE DETECTION AND CORRECTING SYSTEM AND METHOD

BACKGROUND

The invention relates generally to imaging systems and more specifically to a method and system for detecting and correcting edges in images.

Computer aided diagnosis (CAD), such as screening mammography and evaluation of other disease states or medical or physiological events, is typically based upon various types of analysis of a series of collected images. The collected images are analyzed and pathologies of concern are highlighted by the CAD algorithm. The results of CAD are then reviewed by radiologists for final diagnosis. As can be appreciated by those skilled in the art, certain subsequent imaging procedures may become feasible or may be recognized as desirable due to the improved management of data volume.

It should be noted that CAD may be utilized in any imaging modality, such as computed tomography (CT), magnetic resonance imaging (MRI), X-ray systems, ultrasound systems, positron emission tomography (PET), and so forth. CAD algorithms in certain of these modalities may provide advantages over those in other modalities, depending upon the imaging capabilities of the modality, the tissue being imaged, and so forth.

Computed tomography, for example, is generally a diagnostic procedure in which cross-sectional images or slices are made by an X-ray system. The CT scanning procedure combines the use of a computer system and a rotating X-ray device to create detailed cross sectional images or "slices" of a patient's organs and other body parts. The imaging capabilities are physically similar to those of X-ray systems. MRI, ultrasound, PET, and other modalities similarly are adapted to imaging certain tissues or anatomies, and provide advantages to CAD in certain clinical applications.

Typically, the images produced by such imaging systems are required to be accurate which will lead to the right diagnosis. Many techniques are employed to improve the quality of the image and to extract features that provide a basis for further analysis. Edge detection is one such tool which is used to solve many high-level problems in computer vision, such as object recognition, stereo vision, image segmentation, and optical metrology.

It is desirable to accurately locate curved edges in images. The accurate location of curved edges is important as it is used in many image based sizing applications across the field of medicine and metrology. In most images, the action of imaging system point spread function, as well as procedures for removal of noise biases the location of curved edges. It is desirable to determine and correct such biases in the images so as to accurately locate edges and accurately size a feature of interest.

It is also desirable for edge detection algorithms to have low error rates. That is, the shape and location of edges in the image need to be detected accurately and/or false edges should not be detected. Furthermore, it is desirable for the edge detection algorithms to have good edge localization which means that the detected edge should be close to the true edge.

Therefore, there is a need for accurate and efficient edge detection algorithms which can determine and correct the bias existing in images and therefore accurately locate edges.

BRIEF DESCRIPTION

Briefly, according to one aspect of the invention, an image processing method is provided. The method comprises detecting edges in an image of a given substructure and characterizing a blurring factor in the image corresponding to the substructure. The method further comprises correcting a bias in the detected edges of the given substructure using the blurring factor.

In another embodiment, an imaging system for correcting edges in an image is provided. The imaging system comprises an image processor configured to detect edges in an image of a given substructure, characterize a blurring factor in the image and correct a bias in the edges of the given substructure using the blurring factor.

In an alternate embodiment, an imaging method for detecting edges in an image is provided. The method comprises detecting edges in an image of a given substructure and characterizing a blurring factor in the image corresponding to the substructure. The method further comprises providing a bias correction feature for a user to interface with an imaging system to correct a bias in an image.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
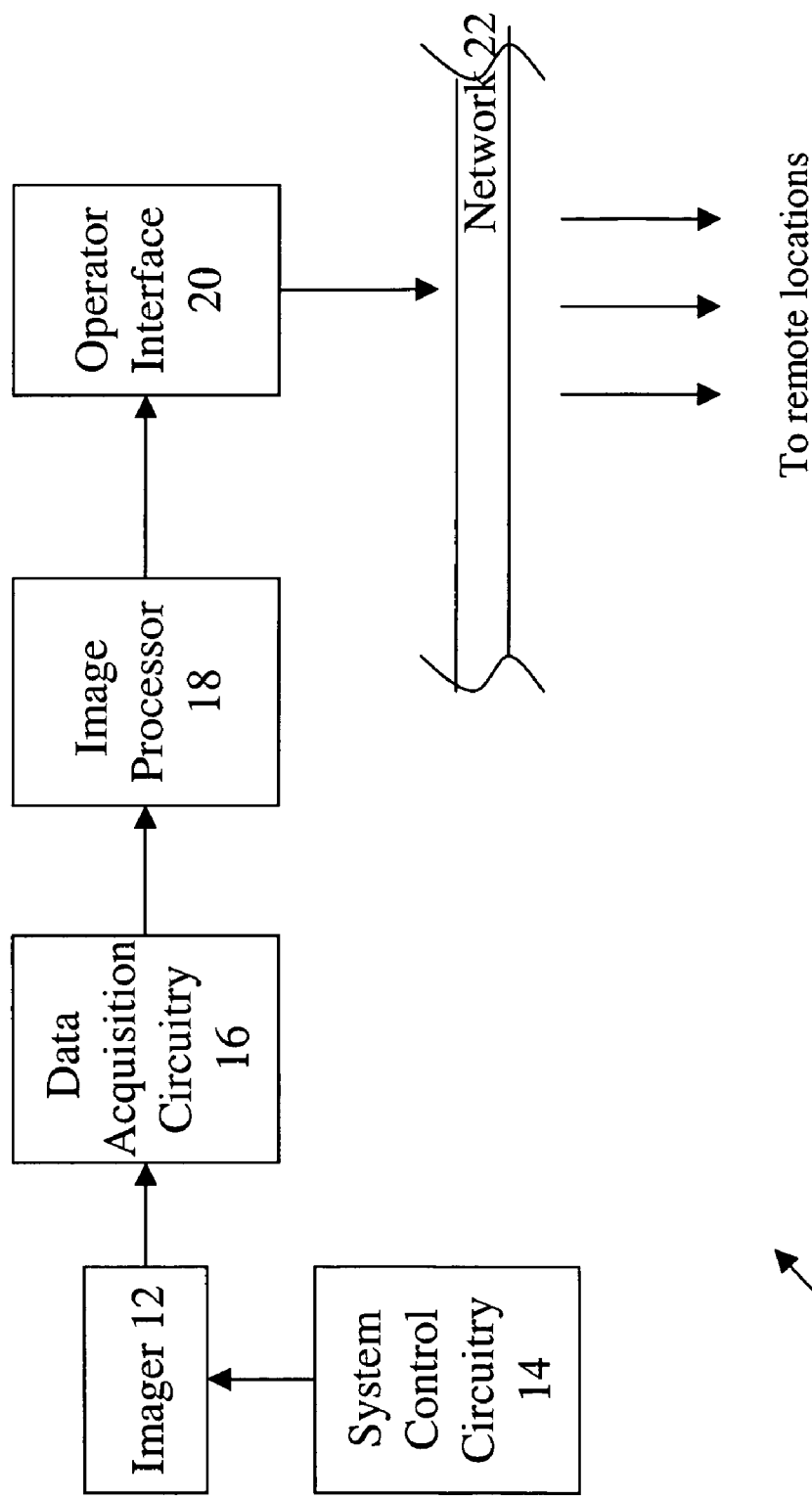
FIG. 1 is a block diagram illustrating one embodiment of an imaging system implemented according to one aspect of the invention.

FIG. 1 is a block diagram illustrating one embodiment of an imaging system 10 implemented according to one aspect of the invention. FIG. 1 illustrates a block diagram of an imaging system 10 to which embodiments of the invention are applicable. FIG. 1 shows an imaging system 10 comprising an imager 12, system control circuitry 14, data acquisition circuitry 16, image processor 18, and operator interface 20. Each component is described in further detail below. Imaging system 10 includes an imager 12, which can be selected from a number of imaging devices known in the art for generating images. Examples of imaging devices include but are not limited to CCD cameras, analog cameras, infra-red cameras, computed tomography (CT) and magnetic resonance imaging (MRI) systems.

During a CT imaging session, a patient lies horizontal and is exposed to a plurality of x-rays measured with a series of X-ray detectors. A beam of x-rays passes through a particular thin cross-section or "slice" of the patient. The detectors measure the amount of transmitted radiation. This information is used to compute the x-ray attenuation coefficient for sample points in the body. A gray scale image is then constructed based upon the calculated x-ray attenuation coefficients. The shades of gray in the image contrast the amount of x-ray absorption of every point within the slice. The slices obtained during a CT session can be reconstructed to provide an anatomically correct representation of the area of interest within the body that has been exposed to the x-rays.

During a MR imaging session, the patient is placed inside a strong magnetic field generated by a large magnet. Magnetized protons within the patient, such as hydrogen atoms, align with the magnetic field produced by the magnet. A particular slice of the patient is exposed to radio waves that create an oscillating magnetic field perpendicular to the main magnetic field. The slices can be taken in any plane chosen by the physician or technician (hereinafter the "operator") performing the imaging session. The protons in the patient's body first absorb the radio waves and then emit the waves by moving out of alignment with the field. As the protons return to their original state (before excitation), diagnostic images based upon the waves emitted by the patient's body are created. Like CT image slices, MR image slices can be reconstructed to provide an overall picture of the body area of interest. Parts of the body that produce a high signal are displayed as white in an MR image, while those with the lowest signals are displayed as black. Other body parts that have varying signal intensities between high and low are displayed as some shade of gray.

As used herein, "adapted to", "configured" and the like refer to devices in a system to allow the elements of the system to cooperate to provide a described effect; these terms also refer to operation capabilities of electrical or optical elements such as analog or digital computers or application specific devices (such as an application specific integrated circuit (ASIC)), amplifiers or the like that are programmed to provide an output in response to given input signals, and to mechanical devices for optically or electrically coupling components together.

Imaging system 10 generally includes some type of imager 12, which detects image data or signals and converts the signals to useful data. As described more fully below, the imager 12 may operate in accordance with various physical principles for creating the image data. In general, however, the imager creates image data indicative of regions of interest in a patient either in a conventional support, such as photographic film, or in a digital medium. Examples of imagers include an X-ray detector, CCD cameras, analog cameras, infra-red cameras, computed tomography detector, radio frequency coil arrays, etc.

The imager operates under the control of system control circuitry 14. The system control circuitry may include a wide range of circuits, such as radiation source control circuits, timing circuits, circuits for coordinating data acquisition in conjunction with patient or table of movements, circuits for controlling the position of radiation or other sources and of detectors, and so forth.

The imager 12, following acquisition of the image data or signals, may process the signals, such as for conversion to digital values, and forwards the image data to data acquisition circuitry 16. For digital systems, the data acquisition circuitry 16 may perform a wide range of initial processing functions, such as adjustment of digital dynamic ranges, smoothing or sharpening of data, as well as compiling of data streams and files, where desired.

The data is then transferred to image processor 18. The image processor is configured to detect edges in an image of a given substructure, characterize a blurring factor in the image and correct a bias in the image of the given substructure using the blurring factor and a measure of the spread of a smoothing kernel convolved with the image, e.g. the standard deviation of a Gaussian kernel.

Processor 18 is also configured to perform computation and control functions for well-known image processing techniques such as reconstruction, image data memory storage, segmentation and the like. Processor 18 may comprise a central processing unit (CPU) such as a single integrated circuit, such as a microprocessor, or may comprise any suitable number of integrated circuit devices and/or circuit boards working in cooperation to accomplish the functions of a central processing unit. Processor 18 is also adapted to execute the various embodiments of the invention that will be described in greater detail below.

Processor 18 desirably includes memory, which may comprise any type of memory known to those skilled in the art. This includes Dynamic Random Access Memory (DRAM), Static RAM (SRAM), flash memory, cache memory, etc. While not explicitly shown in FIG. 1, the memory may be a single type of memory component or may be composed of many different types of memory components. Processor 18 is also capable of executing the programs contained in memory and acting in response to those programs or other activities that may occur in the course of image acquisition and image viewing.

Ultimately, the image data is forwarded to some type of operator interface 20 for viewing and analysis. While operations may be performed on the image data prior to viewing, the operator interface 20 is at some point useful for viewing reconstructed images based upon the image data collected. The images may also be stored in short or long term storage devices, for the present purposes generally considered to be included within the interface 20, such as picture archiving communication systems. The image data can also be transferred to remote locations, such as via a network 22.

It should also be noted that, from a general standpoint, the operator interface 20 affords control of the imaging system, typically through interface with the system control circuitry 12. Moreover, it should also be noted that more than a single operator interface 20 may be provided. Accordingly, an imaging scanner or station may include an interface which permits regulation of the parameters involved in the image data acquisition procedure, whereas a different operator interface may be provided for manipulating, enhancing, and viewing resulting reconstructed images.

Figure 2:
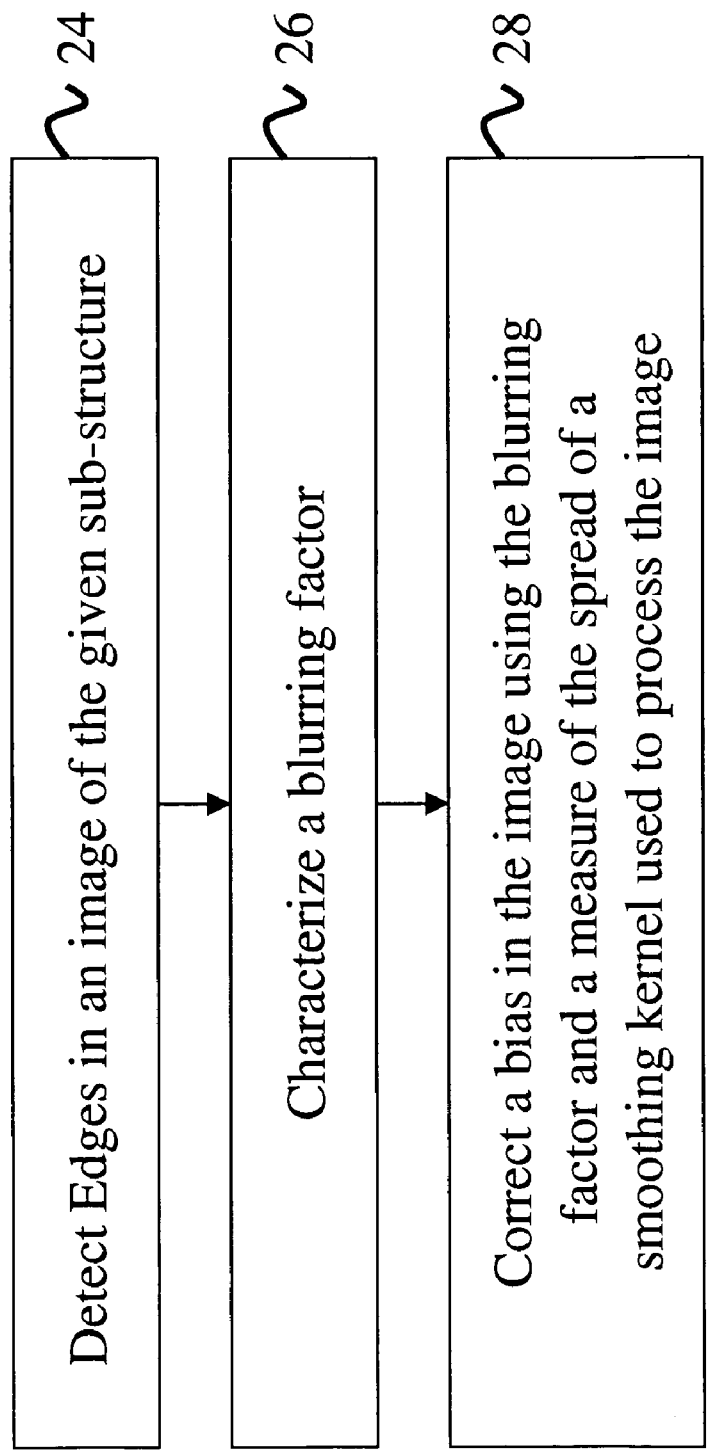
FIG. 2 is a flow chart illustrating one method by which edge detection can be performed on images according to one aspect of the present invention.

FIG. 2 is a flow chart illustrating one method by which edge detection can be performed on images according to one aspect of the invention.

In step 24, edges in an image of a given substructure are detected. In one embodiment, the edges are detected by computing a ratio of a radius of curvature of the detected edges to a scale ('σ'). In a more specific embodiment, a Canny edge detector is used for detecting the edges. In an example, a Gaussian smoothing filter at scales 'σ' equal to 0.00R, 0.30R, 0.54R, 0.70R, 0.80R, and 1.00R is used on the image of a circularly symmetric pulse of radius 10 units of σ. In one embodiment, the scale σ is provided by an operator using the imaging system.

For each value of the scale of the Gaussian smoothing filter, a Canny edge detector with sub-pixel accuracy is run on the image. The mean distance of adjacent edge points to the center of a circle is computed and declared to be the detected radius. It is noted that, the edges detected by computing zeros of a second derivative of an image in a direction of its gradient (such as those computed by a Canny edge detection algorithm) produces a shift in the localization of the edges. By repeating this experiment at various realistic levels of resolution and quantization, it is noted that resolution and quantization have minimal influence on localization accuracy. It is further seen that when the radius is greater than the scale, a shift in the location of edges is towards their center of curvature. Similarly, when the radius is less than the scale, the shift will be in the opposite direction or away from the center of curvature.

As $\sigma$ varies from zero to infinity, the ratio of radius/scale, that is $R/\sigma$, decreases from infinity to zero, for a fixed value of R. As the scale a increases, the detected edge moves towards the center of curvature of the original edge. As the scale a increases to a certain value represented by $\sigma c$, the edge reaches a critical point after which it starts moving back towards the location of the original edge. At a particular value of the scale represented by $\sigma o$ (where $\sigma o > \sigma c$), the location of the detected edge coincides with the original edge. As $\sigma$ increases beyond $\sigma o$, the detected edge continues to shift outward.

In step 26, a blurring factor is characterized in the image corresponding to the substructure. To calculate the blurring factor, first the edge detection by locating the zero crossings of the second derivative of the image in the direction of its gradient is performed, at a scale represented by $\sigma_e$. The blur factor is calculated by combining the contributions from the imaging system's point spread function, $\sigma_b$, with the edge detection scale, $\sigma_e$. The effective scale, representing an estimate of the total amount of smoothing in the image, is $\sigma = \sqrt{\sigma_e^2 + \sigma_b^2}$.

The values of $R/\sigma$ at which such shifts occur can be calculated by the following equations. For a signal $\hat{s}(r)$ represented by equation (1) and produced by convolving of a disk s(r) of amplitude 1 and of radius R with a Gaussian kernel k(r) with standard deviation $\sigma$, the first derivative is represented by equation (2) and the second derivative is represented by equation (3).

$$\hat{s}(r) = R \int_0^\infty e^{-\frac{\sigma^2 \rho^2}{2}} J_o(r\rho) J_1(R\rho) d\rho \quad \text{Equation (1)}$$

$$\frac{d\hat{s}}{dt} = -\frac{R}{\sigma^2} e^{-\frac{(r^2 + R^2)}{2\sigma^2}} I_1\left(\frac{Rr}{\sigma^2}\right) \quad \text{Equation (2)}$$

$$\frac{d^2\hat{s}}{dt^2} = \frac{R}{\sigma^2} e^{-\frac{(r^2 + R^2)}{2\sigma^2}} \left[\left(\frac{r}{\sigma^2} + \frac{1}{r}\right) I_1\left(\frac{Rr}{\sigma^2}\right) - \frac{R}{\sigma^2} I_0\left(\frac{Rr}{\sigma^2}\right)\right] \quad \text{Equation (3)}$$

Figure 3:
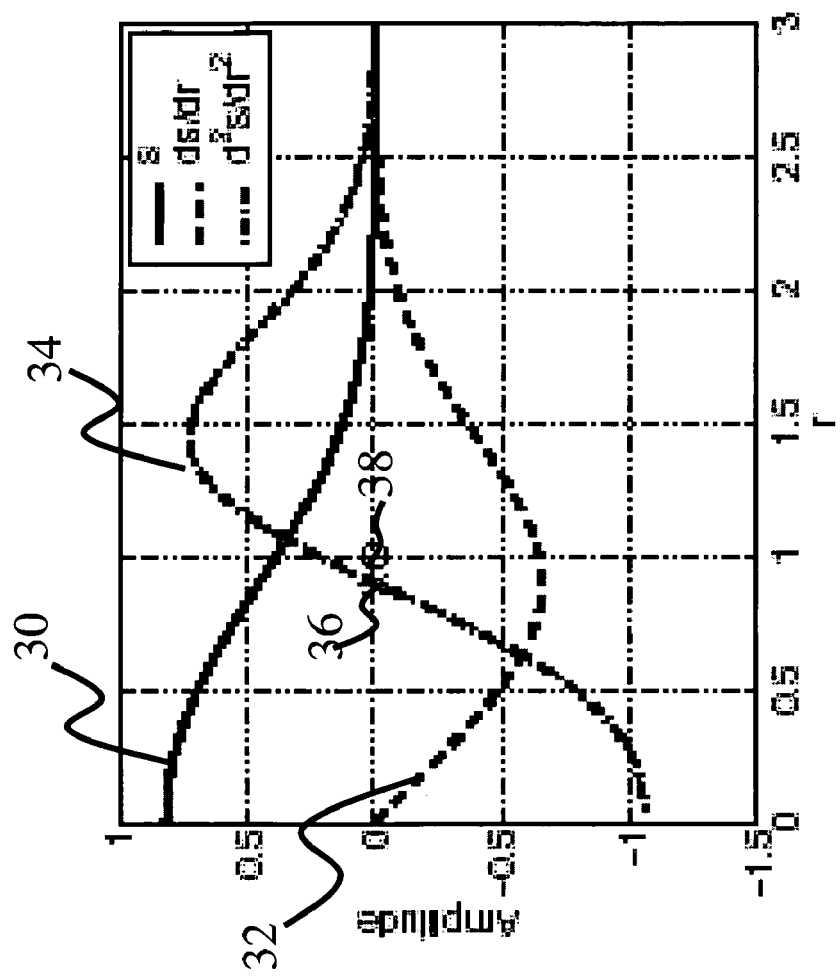
FIG. 3 and FIG. 4 are graphs illustrating true values and detected values of an edge using a corresponding scale according to one aspect of the invention.
Figure 4:
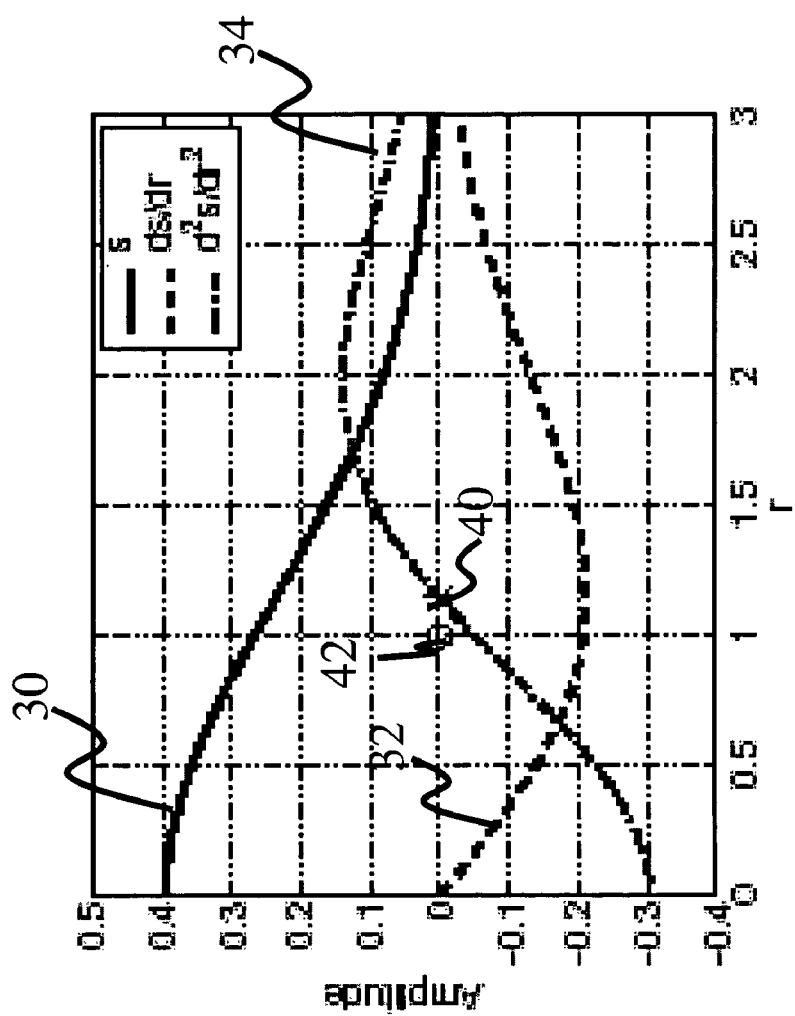

FIG. 3 shows a plot of $\hat{s}(r)$ represented by 30 for a pulse with radius R=1 and using a Gaussian kernel with scale $\sigma$=0.54 R. FIG. 4 shows a plot of $\hat{s}(r)$ for a pulse with radius R=1 and using a Gaussian Kernel with scale $\sigma$=1.0 R. Both FIG. 3 and FIG. 4 show the first derivative represented by 32 and determined by equation (2) and the second derivative represented by 34 and determined by equation (3) as functions of detected edge "r". The zero crossings are indicated by 36 in FIGS. 3 and 40 in FIG. 4. The true positions are indicated by 38 in FIGS. 3 and 42 in FIG. 4.

In the illustrated embodiment of FIG. 3, the location of the detected edge represented by 36 underestimates the true radius by 9.6% when $\sigma$=0.54R. Similarly, in the illustrated embodiment of FIG. 4, the location of the detected edge represented by 40 overestimates the true radius by 14.5% when $\sigma$=1.0R.

Referring back to FIG. 2, in step 28, a bias in the image is corrected using the blurring factor and a standard deviation of the Gaussian smoothing kernel. In one embodiment, the bias is corrected using the ratio calculated in step 24 and a look-up table. The radius of curvature $r_0$ of the detected edges is estimated for each point along the edges by fitting a circle to the point and a number of its closest neighbors. Besides determining the radius of curvature, the center of curvature corresponding to the center of the fitted circle can also be located. For each point along the edges, the ratio $r_0/\sigma$ is computed, and the bias at that point is estimated from the lookup table. The point is then shifted along a line that connects it to the center of curvature according to the output of the lookup table. This procedure is then repeated for all points in the detected edges.

In one embodiment, the look-up table comprises values corresponding to a plurality of pre-measured substructures being comparable to the given substructure. In a more specific embodiment, the look-up table comprises a plurality of pre-determined biases corresponding to a plurality of pre-determined radii of curvature measurements.

Figure 5:
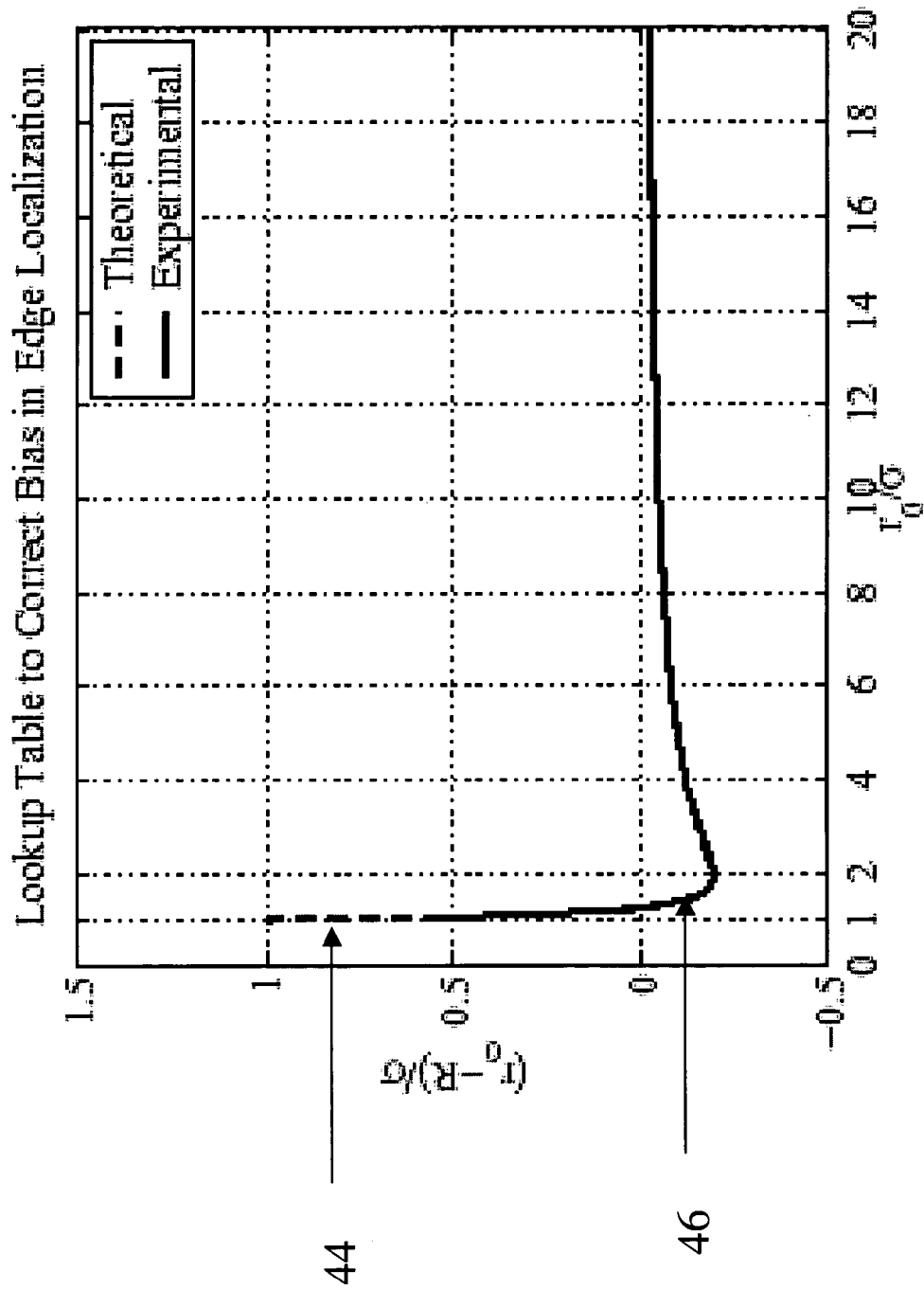
FIG. 5 is one embodiment of a look-up table implemented according to an aspect of the invention.

As described above, the value of ratio of the detected radius $r_0$ to the scale $\sigma$ depends on the ratio of the true radius R and $\sigma$, the relationship between the true radius R, detected radius $r_0$ and scale $\sigma$ can be plotted in a one dimensional plot of $(r_0-R)/\sigma$ as a function of $r_0/\sigma$ as shown in FIG. 5. The curves in FIG. 5 can be interpreted as a look up table to correct the position of a point in an edge as a function of the scale v of the effective smoothing and the measured radius of curvature of the edge at a location of the given point. The dashed curve 44 and solid curve 45 in the figure represent the theoretical and experimental lookup tables, respectively.

In an exemplary embodiment, the blurring and bias correction techniques described above are applied to correct for the underestimated area of tubular structures such as airways, vessel, tumors, etc found by edge detection in CT images. The techniques provided by the invention may also be applied in optical metrology for applications such as hole sizing and fit measurements. The techniques of the invention may further be applied to non-destructive evaluation techniques such as corrosion determination and crack sizing among others. The technique can be further used for inspecting mechanical parts such as turbine airfoils and rotating parts.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An image processing method comprising:
   detecting edges in an image of a given substructure by computing a ratio of a radius of curvature of the detected edges to an effective scale;
   characterizing a blurring factor in the image corresponding to the substructure;
   correcting a bias in the detected edges of the given substructure using the blurring factor.

2. The image processing method of claim 1, wherein the correcting step further comprises measuring a spread a smoothing kernel used to process the image.

3. The image processing method of claim 1, wherein the correcting step utilizes a look-up table of values corresponding to a plurality of premeasured substructures being comparable to the given substructure.

4. The image processing method of claim 3, wherein the look-up table comprises a plurality of pre-determined biases corresponding to a plurality of pre-determined radii of curvature measurements.

5. The image processing method of claim 1, wherein the effective scale is calculated using the blurring factor and a measure of the width of the smoothing kernel used to process the image.

6. The image processing method of claim 3, wherein the correcting step comprises using the ratio and the look-up table to correct the bias in the image.

7. An imaging system for correcting edges in an image, the imaging system comprising:
   an image processor configured to detect edges in an image of a given substructure by computing a ratio of a radius of curvature of the detected edges to an effective scale, characterize a blurring factor in the image and correct a bias in the detected edges of the given substructure using the blurring factor.

8. The imaging system of claim 7, wherein the processor is further configured to measure a spread of a smoothing kernel used to process the image to correct the bias in the detected edges.

9. The imaging system of claim 7, wherein the image processor utilizes a look-up table of values corresponding to a plurality of pre-measured substructures being comparable to the given substructure to correct the bias.

10. The imaging system of claim 7, wherein the effective scale is calculated using the blurring factor and a spread of a smoothing kernel used to process the image.

11. The imaging system of claim 9, wherein image processor is configured to use the ratio and the look-up table to correct the bias in the image.

12. The imaging system of claim 11, wherein the look-up table comprises a plurality of pre-determined biases corresponding to a plurality of predetermined radii of curvature measurements.

13. The imaging system of claim 7, wherein the imaging system is at least one of a computed tomography system (CT), CCD camera, analog camera, infra-red camera, magnetic resonance system, positron emission tomography system, or an ultrasound system.

14. The imaging system of claim 13, wherein the CT system is used for inspecting mechanical parts.

15. The imaging system of claim 13, wherein the mechanical parts include at least one of turbine airfoils and rotating parts.

16. The imaging system of claim 13, wherein the imaging system is used for medical imaging.

17. The imaging system of claim 7, wherein the given substructure is at least one of airways, vessels, tumors.

18. The image processing method of claim 16, further comprising providing a scale selection feature for a user to select a scale for computing the ratio.

19. An imaging method for detecting edges in an image, the method comprising:
   detecting edges in an image of a given substructure by computing a ratio of a radius of curvature of the detected edges to an effective scale;
   characterizing a blurring factor in the image corresponding to the substructure;
   providing a bias correction feature for a user to interface with an imaging system to correct a bias in an image.

* * * * *

UNITED STATES PATENT AND TRADEMARK OFFICE
CERTIFICATE OF CORRECTION

PATENT NO. : 7,433,086 B2  Page 1 of 1
APPLICATION NO. : 10/951301
DATED : October 7, 2008
INVENTOR(S) : Miller et al.

It is certified that error appears in the above-identified patent and that said Letters Patent is hereby corrected as shown below:

In Column 6, Line 20, delete "v" and insert -- σ --, therefor.

Signed and Sealed this

Sixteenth Day of March, 2010

David J. Kappos
*Director of the United States Patent and Trademark Office*